United States Patent
Geiges et al.

(10) Patent No.: US 10,933,771 B2
(45) Date of Patent: Mar. 2, 2021

(54) LONGITUDINAL ADJUSTMENT UNIT OF A SEAT, PARTICULARLY OF A SEAT IN A MOTOR VEHICLE

(71) Applicant: IMS Gear SE & Co. KGaA, Donaueschingen (DE)

(72) Inventors: Christian Geiges, Blumberg (DE); Gabriel Fuchs, Reichenau (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 232 days.

(21) Appl. No.: 16/204,275

(22) Filed: Nov. 29, 2018

(65) Prior Publication Data
US 2019/0168638 A1 Jun. 6, 2019

(30) Foreign Application Priority Data
Dec. 4, 2017 (EP) .................................... 17205228

(51) Int. Cl.
*B60N 2/06* (2006.01)
*F16H 57/00* (2012.01)
(Continued)

(52) U.S. Cl.
CPC .......... *B60N 2/067* (2013.01); *B60N 2/0232* (2013.01); *F16H 25/20* (2013.01);
(Continued)

(58) Field of Classification Search
CPC ............ B60N 2/067; B60N 2002/0236; B60N 2/0232; F16H 57/0025; F16H 25/20
(Continued)

(56) References Cited

U.S. PATENT DOCUMENTS 4,790,202 A 12/1988 Hayahi et al.
5,150,872 A * 9/1992 Isomura ............... B60N 2/0232
248/429

(Continued)

FOREIGN PATENT DOCUMENTS

DE 3640197 10/1987
DE 4208948 9/1992
(Continued)

OTHER PUBLICATIONS

European Patent Office "European Search Report," issued in European Patent Application No. 17205228.4, dated Jul. 10, 2018, document of 9 pages.

*Primary Examiner* — Jason S Morrow
(74) *Attorney, Agent, or Firm* — Akerman LLP; Peter A. Chiabotti

(57) ABSTRACT

A longitudinal adjustment unit of a seat, particularly of a seat in a motor vehicle can include a housing with a through-hole arranged along a longitudinal axis and having a first spindle opening and a second spindle opening, a spindle that can be guided through the through-hole along the longitudinal axis through the housing, a spindle nut, and a screw driving the spindle nut and supported in the housing via a bearing located on both sides. The spindle nut can be supported in the housing in the longitudinal axis so that it can be rotated bidirectionally and axially. Also, at least one fastener can be provided, through which the spindle is connected to the spindle nut in a torque-free manner.

21 Claims, 3 Drawing Sheets

(51) Int. Cl.
*B60N 2/02* (2006.01)
*F16H 25/20* (2006.01)

(52) U.S. Cl.
CPC .. *F16H 57/0025* (2013.01); *B60N 2002/0236* (2013.01); *F16H 2025/209* (2013.01)

(58) Field of Classification Search
USPC ..................................................... 296/65.15
See application file for complete search history.

(56) References Cited

U.S. PATENT DOCUMENTS

| | | | |
|---|---|---|---|
| 5,207,473 | A | 5/1993 | Nawa et al. |
| 8,485,489 | B2 | 7/2013 | Hofschulte et al. |
| 8,904,895 | B2 | 12/2014 | Woehrle et al. |
| 2005/0082890 | A1 | 4/2005 | Taubmann et al. |
| 2008/0011114 | A1 | 1/2008 | Oberle et al. |
| 2008/0282822 | A1* | 11/2008 | Birker .................... B60N 2/067 74/89.39 |
| 2013/0186217 | A1* | 7/2013 | Enokijima ............. B60N 2/067 74/89.33 |
| 2015/0360587 | A1* | 12/2015 | Hoffmann ............ B60N 2/0232 248/429 |
| 2017/0253145 | A1* | 9/2017 | Runde .................. B60N 2/0715 |
| 2019/0100118 | A1* | 4/2019 | Rey ...................... B60N 2/0232 |
| 2019/0202322 | A1* | 7/2019 | Napau ................... B60N 2/067 |
| 2020/0039389 | A1* | 2/2020 | Stemmer ............. B60N 2/0232 |

FOREIGN PATENT DOCUMENTS

| | | |
|---|---|---|
| DE | 19642655 | 6/1998 |
| DE | 19815283 | 10/1999 |
| DE | 102004013009 | 10/2005 |
| DE | 102006009576 | 9/2007 |
| DE | 102006022947 | 9/2007 |
| DE | 102006052936 | 5/2008 |
| DE | 102009003280 | 11/2010 |
| DE | 102016203639 | 9/2017 |
| JP | H09207632 | 12/1997 |

* cited by examiner

LONGITUDINAL ADJUSTMENT UNIT OF A SEAT, PARTICULARLY OF A SEAT IN A MOTOR VEHICLE

CROSS-REFERENCE TO RELATED APPLICATIONS

This application claims priority to European Patent Application No. 17205228.4, filed Dec. 4, 2017, which is incorporated by reference in its entirety.

BACKGROUND

The patent application relates to a longitudinal adjustment unit of a seat, particularly of a seat in motor vehicles, according to the features and structures recited herein.

Such longitudinal adjustment units are well known in the art and serve for adjusting the position of a seat in a vehicle. Typically, longitudinal adjustment units interact with a lower rail defined on a chassis and an upper rail arranged within the lower rail, with the upper rail being movable in a motor-driven manner via the longitudinal adjustment unit. The upper rail adjustment via the longitudinal adjustment unit is performed using a spindle arranged within the upper rail and supported on its respective first end and second end.

Two different drive concepts are known in the art, namely longitudinal adjustment units with a stationary spindle on the one hand and, on the other hand, longitudinal adjustment units with a rotating spindle. In the case of a stationary spindle, a transmission fixedly coupled to the upper rail is used in order to adjust the upper rail in relation to the lower rail. In the case of a rotating spindle, the transmission drives the spindle in a rotating manner and a spindle nut, fixedly coupled to the upper rail, converts the rotary motion of the spindle to a lateral motion along the longitudinal axis.

Examples for longitudinal adjustment units, for example, have been described in DE 36 40 197 A1, DE 42 08 948 C2, DE 196 42 655 C2, DE 198 15 283 A1, DE 10 2004 013 009 A1 and DE 10 2006 052 936 A1.

The disadvantage of this state of the art is that, depending on the desired drive concept, i.e. using a rotating spindle or using a stationary spindle, different longitudinal adjustment units are used. Due to the high requirements regarding a longitudinal adjustment unit, which, in addition to the adjusting feature, must also provide for accident safety, such longitudinal adjustment units are characterized by different designs so that different production methods and processes must be applied.

Thus, the present disclosure is based on the task of providing a specifically compact longitudinal adjustment unit which may be used, regardless of the selected drive concept, both for longitudinal adjustment units with a rotating spindle and for longitudinal adjustment units with a stationary spindle. The longitudinal adjustment unit according to the present disclosure for seats, particularly in motor vehicles, is intended to be producible from a minimum number of simply designed, possibly standardized parts so that the parts used may be produced in a cost-effective manner and do not require any costly post-processing. Additionally, the logistic spending and the holding cost is intended to be reduced by re-using the parts.

SUMMARY

This task is achieved by a longitudinal adjustment unit including the features and structures recited herein.

Further developments of the present disclosure are the subject of the sub-claims.

The longitudinal adjustment unit according to the present disclosure of a seat, particularly of a seat in a motor vehicle, comprises a housing including a through-hole arranged along a longitudinal axis and having a first spindle opening and a second spindle opening. Further, the longitudinal adjustment unit according to the present disclosure comprises a spindle that can be guided through the through-hole of the housing, a spindle nut, and a screw. The screw is supported in the housing via a bearing located on both sides and drives the spindle nut. Further, the spindle nut is supported so as to rotate bidirectionally in the longitudinal axis and axially in the housing, with a fastener being provided that can be used in order to connect the spindle to the spindle nut in a torque-proof manner.

According to a preferred embodiment of the present disclosure, the fastener provides for a positively interlocking and/or force-fitted connection between the spindle nut and the spindle, with the connection between the spindle nut and the spindle particularly preferred being a detachable connection that is capable of providing a connection between the spindle nut arranged within the housing and the spindle from the outside, without having to open/close the housing.

Further, the fastener may provide a firmly bonded connection between the spindle and the spindle nut. Such firmly bonded connections are created specifically by adhesion, welding, soldering or vulcanizing. As a consequence of the adhesive bond, the connection between the spindle nut and the spindle may be secured in a particularly robust and low-cost manner.

According to another preferred advantageous embodiment of the present disclosure, the at least one fastener may be arranged inside the spindle nut. The through-hole of the spindle nut with the spindle female thread may be designed as a blind hole, with the side of the spindle through-hole facing away from the spindle being closed and/or blocked. Thus, the blind hole and/or the spindle nut forms the fastener. Further, the fastener within the spindle nut may also be a grub screw that may be screwed into the spindle female thread of the spindle nut in order to connect the spindle nut and the spindle in a torque-proof manner, thus countering the spindle inside the spindle nut.

Further preferred, the spindle female thread of the spindle nut may be characterized by a buckling or extension of the spindle threads, a reduction of the cross-section or such like in the manner of a screw locking device. Such geometric variations to the spindle nut may be produced particularly easily and economically applying an injection-molding process.

Moreover, it has proved to be advantageous if the fastener is a spindle counter nut. The spindle counter nut may be warped with the spindle nut in the manner of a counter screw. The spindle counter nut may easily be fitted onto the spindle and then rotated to the designated position so that assembly is particularly simple and low-cost.

It is advantageous if, on the side facing the spindle nut, the spindle counter nut has a sleeve that can be inserted into the housing through the first spindle opening and/or the second spindle opening. The outer diameter of the sleeve is dimensioned smaller than the inner diameter of the respective spindle opening of the housing.

On the side of the spindle counter nut facing the spindle nut, a contact face may be arranged more preferably, with the contact face having an increased surface roughness. The contact face may, for example, have a roughening, cannelure, or such like.

According to another embodiment of the present disclosure according to the present disclosure, it is advantageous if the spindle nut is supported on the housing via at least one plain bearing bushing. To this end, the spindle nut is equipped with a bearing in the area of a first end face and a second end face, with the bearing being supported on the housing via the anti-friction bushing. The anti-friction bushing may be produced from a metal material, or from a plastic material with improved sliding properties, or from a traditional plastic material.

Further, the spindle nut may, on at least one of the two end faces, have a sleeve-like extension protruding through one of the spindle openings from the housing. As a consequence, the spindle nut can be accessed from the outside of the housing and a torque-proof connection between the spindle nut and the spindle can be provided in a particularly easy manner. For example, a splint may be introduced as a fastener by providing a drilled hole in the sleeve-like extension and the spindle. Welded connections, clamping connections, or other traditional shaft-hub connections may be used as well.

The spindle nut may have a contact face on at least one of the end faces, with the contact face having an increased surface roughness. Preferably, the contact face is equipped with a cannelure in the manner of a serrated washer. Particularly preferred, the contact face is arranged only on the side facing towards the fastener and/or the spindle counter nut.

According to another advantageous embodiment of the present disclosure, it is particularly advantageous if the spindle counter nut has an outer contour for torque transmission, preferably a hexagonal head, whereby the spindle counter nut can be attached in a particularly easy-to-assemble manner. The outer contour of the spindle counter nut can be varied as required, but should facilitate installation, particularly installation supported by tools.

Furthermore, it is advantageous if the screw can be coupled with a drive motor. Thus, the drive motor is coupled to the spindle via the screw and the threaded nut in such a way that, if the drive motor is connected, the spindle describes a rotary motion around the longitudinal axis.

Furthermore, it is advantageous if the housing consists of a first housing part and a second housing part. As a consequence of the two-part design of the housing, the assembly of the longitudinal adjustment unit is particularly simple.

It is particularly advantageous if the first housing part and the second housing part form the first spindle opening and the second spindle opening in equal parts in each case. Accordingly, the separating layer between the first housing part and the second housing part is on the longitudinal axis, with, more preferably, the separating layer between the first housing part and the second housing part being orthogonally to an axis of the screw. On the one hand, this results in a particularly simple and easy assembly and, on the other hand, the two-part housing is characterized by a good load distribution when accepting axial forces from the spindle nut, particularly in the event of a strong braking event or in an accident situation.

Further, it is particularly advantageous if the housing and/or the two housing parts are located in a U-shaped retaining bracket, whereby the housing can be connected in a particularly easy and accident-proof manner to a chassis or such like. In this, the retaining bracket more preferably is made in a U shape from a bent metal material and grabs the housing in the longitudinal axis so that axial forces from the spindle can be accepted particularly well.

In this, it has proven to be particularly advantageous if at least one damper is arranged between the U-shaped retaining bracket and the housing. As a consequence of the damper, the longitudinal adjustment unit and/or the housing, including the transmission and the drive motor, is decoupled from the chassis in a vibration-free manner. As a consequence, any transmission of disturbing noise between the longitudinal adjustment unit and the chassis is prevented, thereby increasing the room climate in a motor vehicle that is equipped with a longitudinal adjustment unit according to the present disclosure.

According to another advantageous embodiment of the present disclosure, the housing and/or the first housing part and the second housing part is/are made of a metal material.

Moreover, it has proven to be particularly advantageous if the first housing part and the second housing part are connected to one another via a clamping, snap-on, adhesive, welding, and/or screwed connection.

BRIEF DESCRIPTION OF DRAWINGS

Below, an exemplary embodiment according to the present disclosure of the present disclosure will be explained referring to the attached figures. The Figures show the following.

DETAILED DESCRIPTION

Figure 1:
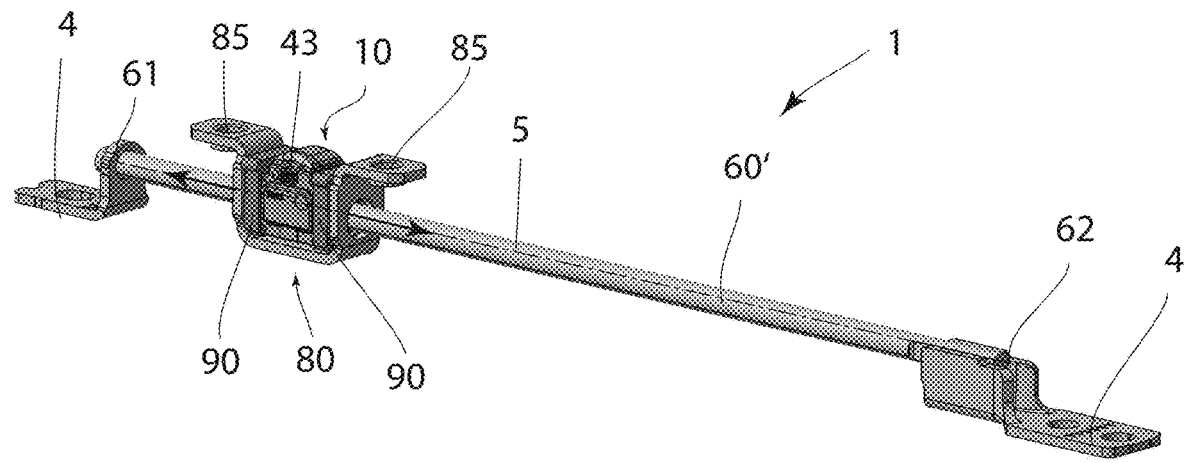
FIG. 1 longitudinal adjustment unit with a stationary spindle and a transmission arranged in the housing that can be driven by a motor, via which the longitudinal adjustment unit may be moved along the stationary spindle, FIG. 2 a longitudinal adjustment unit according to the present disclosure with a pivoted spindle that is driven by the transmission of the longitudinal adjustment unit, FIG. 3 a schematic and enlarged exploded representation of the longitudinal adjustment unit of FIG. 2, and FIG. 4 a sectional view of the longitudinal adjustment unit of FIGS. 2 and 3.

Below, reference to the FIGS. 1 to 4 is being made in order to describe a longitudinal adjustment unit 1 according to a preferred exemplary embodiment of the present disclosure in detail. In the Figures, identical parts indicate parts with the same reference numeral and the same functional meaning.

FIG. 1 shows an exemplary representation of the longitudinal adjustment unit 1 with a stationary spindle 60' for a seat (not shown) of a motor vehicle. On a first end 61 and on a second end 62, the spindle 60' is attached to a chassis (not shown) via one mounting bracket 4 in each case.

In the present example, the mounting bracket 4 on the second end 62 of the spindle 60' is designed in such a way that any rotation of the spindle 60' around a longitudinal axis 5 is prevented.

On the spindle 60', a housing 10 including a transmission 2 is arranged that is attached to a rail (not shown) that can be moved in relation to the chassis in a retaining bracket 80 via dampers 90. A square opening 43 allows for connecting a drive, rendering the transmission 2 drivable through a motor and the housing 10 movable along the longitudinal axis 5 in the directions indicated by arrows.

Figure 2:
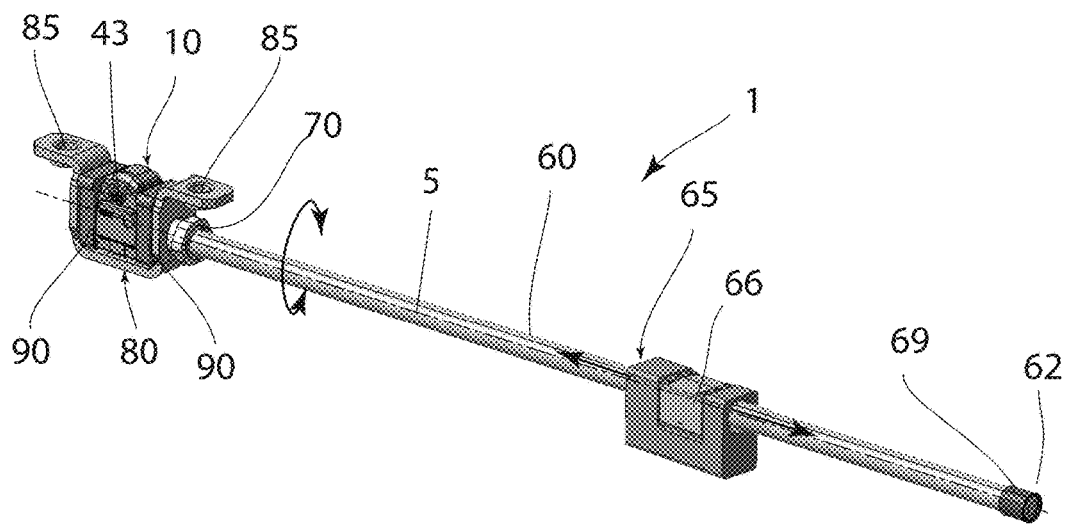

FIG. 2 shows the drive concept of the longitudinal adjustment unit 1 with a rotary spindle 60. Within the framework of this drive concept, the housing 10 has a stationary position—here, at the first end 61—along the longitudinal axis 5 of the spindle 60. At the second end 62, the spindle 60 is supported by a bearing 69. In the event of the transmission being connected, the spindle 60 starts to rotate around the longitudinal axis 5, which is indicated with the help of arrows in FIG. 2. The rotation is used to move a carriage 65 arranged on the spindle 60 with a carriage spindle nut 66 along the longitudinal axis 5 in the directions indicated using arrows. The carriage and/or the carriage spindle nut 66 are coupled firmly to an upper or lower rail (not shown).

Figure 3:
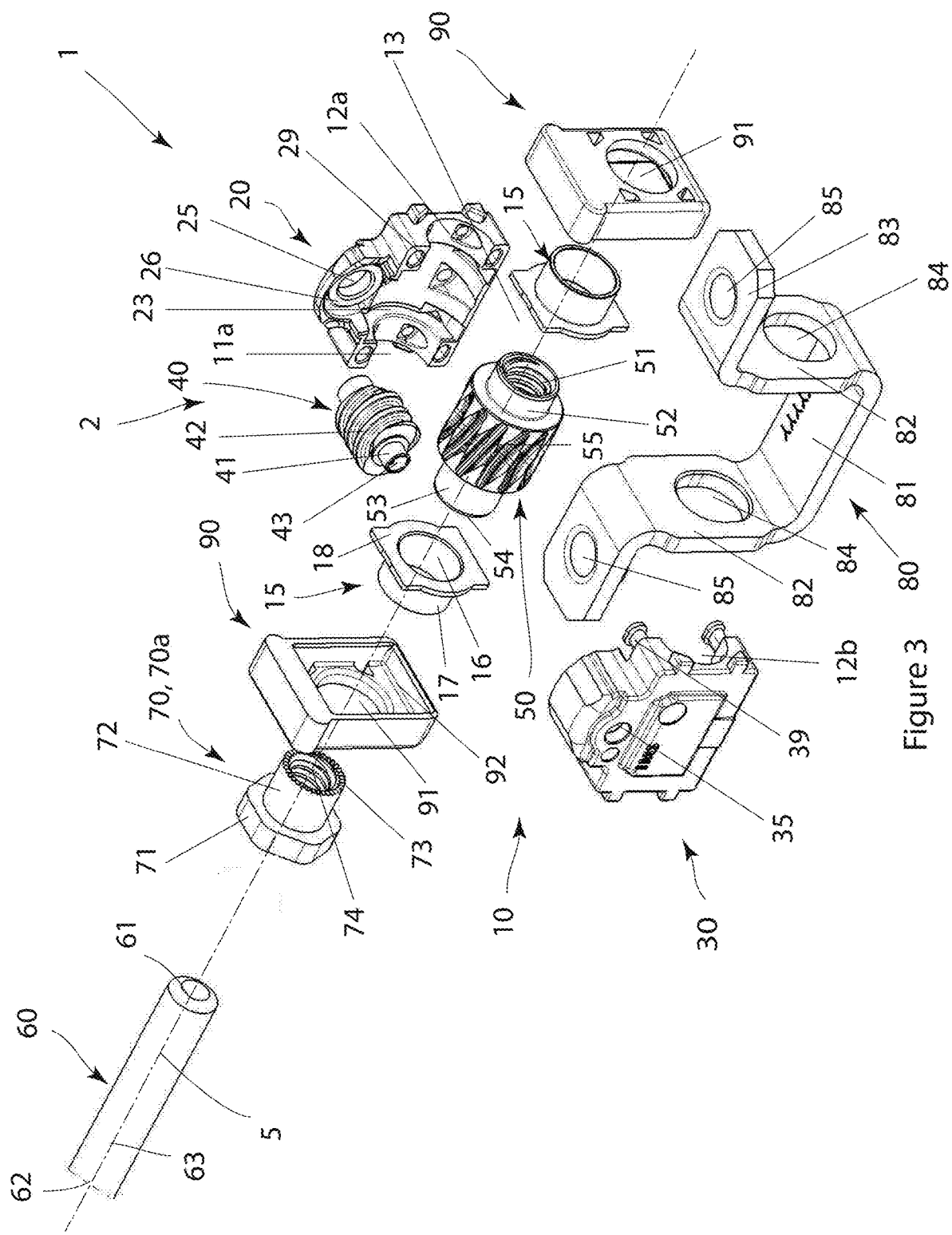
Figure 4:
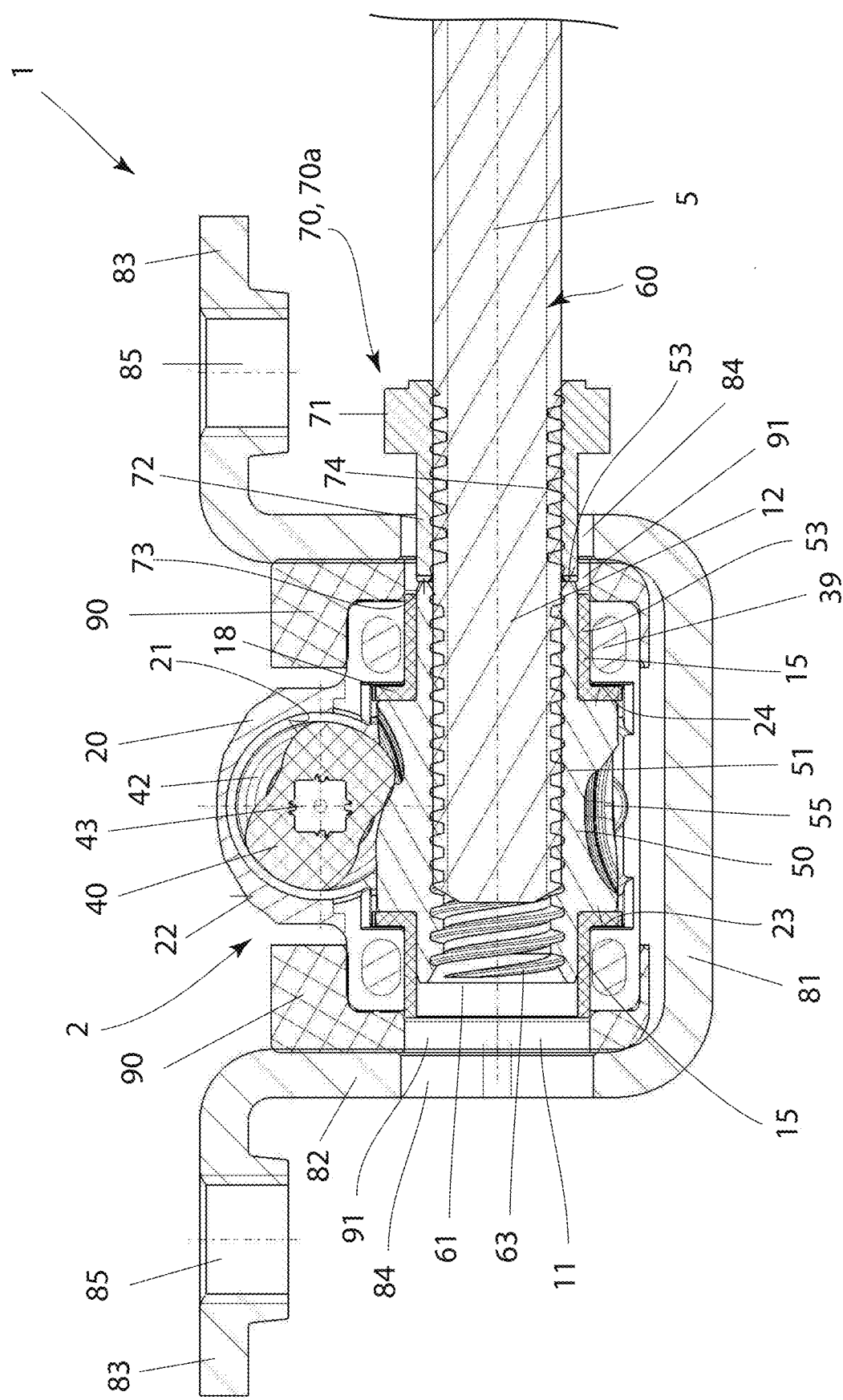

The individual components of the longitudinal adjustment unit 1 are shown in detail in the exploded representation in FIG. 3 and the sectional representation in FIG. 4.

The longitudinal adjustment unit 1 comprises the housing 10 the transmission 2 is arranged in. The transmission 2 consists of a screw 40 and a spindle nut 50, with the screw 40 driving the spindle nut 50. To this end, the screw 40 is equipped with a screw thread 42 combing into a tooth system 55 of the spindle nut 50.

The spindle nut 50 is located on a spindle 60 so that a rotation of the screw 40 is converted to a rotation of the spindle nut 50 with corresponding gear reduction. In the event of a drive concept with a stationary spindle 60, as shown in FIG. 1, a rotation of the screw 40 is converted to a linear motion of the housing 10 along the longitudinal axis 5.

In the event of a drive concept with a stationary spindle 60', shown in FIG. 1, the rotation of the spindle nut 50 results in a displacement of the housing 10 along the longitudinal axis 5 and the spindle 60' crosses the housing 10 through the through-hole 13.

In order to implement the drive concept including a rotary spindle 60, shown in FIG. 2, the rotary motion of the spindle nut 50 is coupled with the spindle 60. To this end, a spindle counter nut 70a is provided as a fastener 70 that may be used in order to provide a torque-proof connection between the spindle nut 50 and the spindle 60. In this regard, the housing 10 as well as the transmission 2 and the damper 90 and the retaining bracket 80 are designed identically for both drive concepts. Accordingly, these parts/assemblies may be used for both drive concepts.

The housing 10 of the longitudinal adjustment unit 1 is designed with two parts and comprises a first housing part 20 and a second housing part 30. Moreover, the housing 10 is characterized by a through-hole 13 with a first spindle opening 11 and a second spindle opening 12. The first spindle opening 11 and the second spindle opening 12 are arranged coaxially in relation to the longitudinal axis 5 and are dimensioned larger than the spindle 60 so that the first can be guided through the latter along the longitudinal axis 5 without making any contact.

The first housing part 20 and the second housing part 30 substantially are designed symmetrically and form the respective spindle opening 11, 12 in equal parts. Accordingly, the first spindle opening 11a, 11b and the second spindle opening 12a, 12b are two-part, with the spindle openings 11a, 11b, 12a, 12b each being semicircular recesses in the housing parts 20, 30. The first housing part 20 and the second housing part 30 are connected to one another via fastening elements 29, 39. The fastening elements 29, 39 may be screwed connections, clamping connections, snap-in connections or such like, with the fastening elements 29, 39 preferably being arranged orthogonally to the longitudinal axis 5 and adjacently to the spindle openings 11, 12. Herein, the fastening elements 29, 39 are arranged in the separating layer between the first housing part 20 and the second housing part 30 above and below the spindle openings 11, 12.

The first housing part 20 has an inner side 21 and an outer side 22 and the second housing part 30 has an inner side 31 and an outer side 32. The inner sides 21, 31 of the two housing parts 20, 30 substantially are designed identically and/or symmetrically.

Within the through-hole 13, the spindle nut 50 is supported within the housing 10 by means of plain bearing bushings 15. To this end, the spindle nut 50 has a bearing 52 formed from a ring-shaped flange on both sides, with this being supported via the plain bearing bushing 15 at the first spindle opening 11 on the on hand and, on the other hand, at the second spindle opening 12 in a rotary and axial manner in each case. Thus, the spindle nut 50 is supported axially on both sides inside the housing 10.

The plain bearing bushing 15 further comprises a sheet 18 and a sleeve 17 that are characterized by a through-hole 16. The sleeve 17 is fitted onto the bearing 52 and supports the spindle nut 50 radially and bridges the separating layer between the first housing part 20 and the second housing part 30. The sheet 18 is configured to contact a border 23 of the first spindle opening 11 and/or a border 24 of the second spindle opening 12 in a torque-proof manner and to support the spindle nut 50 axially without any clearance. Thus, the borders 23, 24 accept the axial forces from the spindle 60.

The screw 40 is fitted onto the spindle nut 50 so that a screw thread 42 of the screw 40 combs a tooth system 55 of the spindle nut 50. The screw thread 42 and the tooth system 55 correspond accordingly.

The screw 40 is arranged at a distance and an angle of 90° in relation to the spindle 60 and is supported, on the one hand, via a bearing 41 in a circular opening 25 with a circular border 26 on the inside 21 of the first housing part 20 and, on the other hand, via a bearing 41 in a circular opening 35 with a circular border 36 on the inside 31 of the second housing part 30. Moreover, a square opening 43 is inserted or molded into one of the free ends of the screw 40, through which a positively interlocking coupling with a drive unit may be made.

As already described above, the spindle nut 50 is supported inside the two-part housing 10 coaxially in relation to the longitudinal axis 5 in the through-hole 13 and is characterized by a through-hole with a spindle female thread 74 corresponding to the spindle male thread 63 of the spindle 60.

In order to couple the spindle nut 50 with the spindle 60, a spindle counter nut 70a is screwed to the spindle 60, with it being substantially modelled on a traditional spindle nut with the spindle female thread 74 and having a hexagonal head 71 for easy installation using an open-end wrench. In so doing, the spindle counter nut 70a may be screwed to the spindle 60 on the side of the housing 10 facing towards the carriage 65 or on the side of the housing 10 facing away from the carriage 65. On the side of the spindle counter nut 70a facing towards the spindle nut 50 a sleeve 72 is molded or attached that is dimensioned in the longitudinal axis 5 in such a way that it can be warped through the first spindle opening 11 or the second spindle opening 12 and/or through the through-hole 16 of the plain bearing bushing 15 against the spindle nut 50 inside the housing 10. The diameters of the first spindle opening 11, the second spindle opening 12, and the through-hole 16 are larger than the diameter of the sleeve 72 so that the spindle counter nut 70a can be rotated freely with the spindle 60. When dimensioning the length of the sleeve 72, the length of the retaining bracket 80 and the length of the dampers 90 in the longitudinal axis 5 must be taken into account in order to ensure that there is sufficient clearance in the longitudinal axis 5 between the hexagonal head 71 and the stationary parts.

In order to provide for the best-possible connection between the spindle nut 50 and the fastener 70 and/or the spindle counter nut 70a, the spindle counter nut 70a and the spindle nut 50 have a contact face 54, 73 on the end faces facing towards one another in each case. The contact face 54 is arranged on the side of the spindle nut 50 facing towards the spindle counter nut 70a and the contact face 73 is arranged on the side of the spindle counter nut 70a facing towards the spindle nut 50. The contact faces 54, 73 have an increased surface roughness preferably being characterized by a cannelure, for example in the manner of a serrated washer. The two ring-shaped flanges of the spindle nut 50, each forming the bearing 52, have different lengths in the longitudinal axis 5. The ring-shaped flange on the side facing towards the spindle counter nut 70a is longer than the one on the side facing away from the spindle counter nut 70a and, in the longitudinal axis 5, projects from the through-hole 16 of the plain bearing bushing 15. Accordingly, the spindle counter nut 70a is asymmetrical.

Moreover, the spindle counter nut 70a may be equipped with a screw and/or thread locking device. Numerous force-fitted, positively interlocking or firmly bonded screw and/or thread locking devices are known in the art that may be used in the present present disclosure.

When dimensioning the sleeve 72 of the spindle counter nut 70a and the spindle nut 50, it must be observed that the ring-shaped contact faces 54, 73 are dimensioned sufficiently large in order to provide for a torque-proof connection.

Alternatively or additionally, the spindle nut 50 may have a sleeve-like extension 53 on the side facing towards the spindle counter nut 70a. The sleeve-like extension 53 of the spindle nut 50 may be designed in such a way that it projects from the housing 10 and through the damper 90 and the retaining bracket 80 and, thus, can be accessed from the outside without having to open the housing 10. A spindle nut 50 designed as mentioned above may easily be connected to the spindle 60 via a welded connection, a screwed connection, a splint, or such like.

The housing 10 is supported in a retaining bracket 80 on both sides along the longitudinal axis 5 via dampers 90, with the dampers 90 having a retaining pocket 92 on the side facing the housing 10, grabbing the housing 10 in certain areas. The dampers 90 decouple the housing 10 from the retaining bracket 80 in a vibration-free manner. The dampers 90 as well as the retaining bracket 80 each have openings 84, 91 aligned along the longitudinal axis 5 the spindle 60 can be guided through. Further, the openings 84, 91 are dimensioned sufficiently large so that the sleeve 72 of the spindle counter nut 70a or the sleeve-like extension 53 of the spindle nut 50 can be guided therethrough without making any contact.

The retaining bracket 80 is substantially U-shaped and comprises a horizontal U-shaped leg 81, two vertical U-shaped legs and two horizontal legs 83 that are incorporated into the attachment openings 85. The horizontal U-shaped leg 81 and the two vertical U-shaped legs 82 grab the housing 10 and the two dampers 90 hold this assembly together without any gaps and/or clearances.

Thus, a longitudinal adjustment unit 1 may be provided in accordance with the present disclosure that may be used both for a drive concept with a stationary spindle 60 and for a drive concept with a rotating spindle 60 without requiring any post-processing of individual parts. The longitudinal adjustment unit 1 according to the present disclosure can be installed particularly easily, is accident-proof and may be produced at low cost and reduces the logistic spending as well as storage cost due to the fact that it is possible to use it in both drive concepts.

LIST OF REFERENCE NUMERALS

1 Longitudinal adjustment unit
4 Mounting bracket
5 Longitudinal axis
10 Housing
11 First spindle opening
12 Second spindle opening
15 Plain bearing bushing
16 Through-hole
17 Lateral surface
18 Contact surface
20 First housing part
23 Border of 11
24 Border of 12
25 Circular opening for 40
26 Circular border
29 Fastening elements
30 Second housing part
33 Border of 11
34 Border of 12
35 Circular opening for 40
36 Circular border
39 Fastening elements
40 Screw
41 Bearing of the screw
42 Screw thread
43 Square opening
50 Spindle nut
51 Spindle female thread
52 Bearing of the spindle nut
53 Sleeve-like extension
54 Contact face of 50
55 Tooth system
60 Spindle
61 First end of 60
62 Second end of 60
63 Spindle male thread
65 Carriage
66 Carriage spindle nut
70 Spindle counter nut
71 Hexagonal head
72 Sleeve
73 Contact face
74 Spindle female thread
80 U-shaped profile
81 Horizontal U-shaped leg
82 Vertical U-shaped leg
83 Horizontal leg
84 Opening
85 Attachment openings
90 Damper
91 Through-hole
92 Retaining pocket

What is claimed:

1. A longitudinal adjustment unit of a vehicle seat, comprising:
    a housing including a through-hole arranged along a longitudinal axis and having a first spindle opening and a second spindle opening,
    a spindle extending through the through-hole along the longitudinal axis through the housing, a spindle nut,
a screw that drives the spindle nut and is supported in the housing by a bearing arranged on both sides,
wherein the spindle nut is mounted so as to rotate bidirectionally in the longitudinal axis and axially in the housing,
a fastener connecting the spindle to the spindle nut in a torque-proof manner, and
wherein the fastener is a spindle counter nut.

2. The longitudinal adjustment unit of claim 1, wherein the fastener provides for a positively interlocking and/or force-fitted and removable connection between the spindle nut and the spindle.

3. The longitudinal adjustment unit of claim 1, wherein the fastener provides for a firmly bonded connection between the spindle and the spindle nut.

4. The longitudinal adjustment unit of claim 1, wherein the fastener is arranged in the spindle nut.

5. The longitudinal adjustment unit of claim 1, wherein the spindle counter nut has a sleeve, which can be introduced through the first spindle opening and/or the second spindle opening into the housing.

6. The longitudinal adjustment unit of claim 1, wherein the spindle counter nut has a contact face with a higher surface roughness than at least one other surface of the spindle counter nut, wherein the contact face is located on a side pointing towards the spindle nut.

7. The longitudinal adjustment unit of claim 6, wherein the contact face is a serrated cannelure.

8. The longitudinal adjustment unit of claim 1, wherein further comprising a plain bearing bushing located between the spindle nut and the housing.

9. The longitudinal adjustment unit of claim 1, wherein the spindle nut has a sleeve-like extension projecting from the housing through the first spindle opening, the second spindle opening or both the first spindle opening and the second spindle opening.

10. The longitudinal adjustment unit of claim 1, wherein the spindle nut has a contact face with an increased surface roughness relative to at least one other surface of the spindle nut, wherein the contact face is located an end of the spindle nut.

11. The longitudinal adjustment unit of claim 1, wherein the spindle counter nut has a hexagonal head.

12. The longitudinal adjustment unit of claim 1, wherein the spindle has a bearing on a second end.

13. The longitudinal adjustment unit of claim 1, wherein the screw is coupled with a drive motor and the drive motor is rotates the spindle around the longitudinal axis via the screw and the threaded nut.

14. The longitudinal adjustment unit of claim 1, wherein the housing is comprised of a first housing part and a second housing part.

15. The longitudinal adjustment unit of claim 14, wherein the first housing part and the second housing part each form the first spindle opening and the second spindle opening in equal parts.

16. The longitudinal adjustment unit of claim 15, wherein the housing is attached via a U-shaped retaining bracket and a damper is arranged between the housing and the U-shaped retaining bracket.

17. The longitudinal adjustment unit of claim 16, wherein a damper is arranged between the housing and the U-shaped retaining bracket.

18. The longitudinal adjustment unit of claim 15, wherein the first housing part and the second housing part are connected to one another via a clamping, snap-on, adhesive, welding, screwed connection, or a combination thereof.

19. A vehicle seat adjustment device, comprising:
a housing, comprising a first housing part and second housing part that when assembled with each other define a through-hole arranged along a longitudinal axis and a first spindle opening and a second spindle opening, each of which is arranged to accept a spindle extending through the through-hole along the longitudinal axis through the housing;
a spindle nut mounted to rotate bidirectionally in the longitudinal axis and axially in the housing;
a bearing;
a screw that drives the spindle nut and is supported in the housing by the bearing;
a fastener that connects the spindle nut to the spindle in a torque-proof manner; and
wherein the fastener has a contact face formed by a serrated cannelure and the contact face is located on a side pointing towards the spindle nut.

20. A longitudinal adjustment unit of a vehicle seat, comprising:
a housing including a through-hole arranged along a longitudinal axis and having a first spindle opening and a second spindle opening,
a spindle extending through the through-hole along the longitudinal axis through the housing,
a spindle nut,
a screw that drives the spindle nut and is supported in the housing by a bearing arranged on both sides,
wherein the spindle nut is mounted so as to rotate bidirectionally in the longitudinal axis and axially in the housing,
a fastener connecting the spindle to the spindle nut in a torque-proof manner, and
wherein the spindle nut has a sleeve-like extension projecting from the housing through the first spindle opening, the second spindle opening or both the first spindle opening and the second spindle opening.

21. A longitudinal adjustment unit of a vehicle seat, comprising:
a housing including a through-hole arranged along a longitudinal axis and having a first spindle opening and a second spindle opening,
a spindle extending through the through-hole along the longitudinal axis through the housing,
a spindle nut,
a screw that drives the spindle nut and is supported in the housing by a bearing arranged on both sides,
wherein the spindle nut is mounted so as to rotate bidirectionally in the longitudinal axis and axially in the housing,
a fastener connecting the spindle to the spindle nut in a torque-proof manner, and
wherein the spindle nut has a contact face with an increased surface roughness relative to at least one other surface of the spindle nut, wherein the contact face is located an end of the spindle nut.

* * * * *